Jan. 26, 1926.
A. TROSCH ET AL
1,570,799
WORK CLAMPING MECHANISM FOR VERTICAL BORING AND TURNING MILLS
Filed March 29, 1924    3 Sheets-Sheet 1
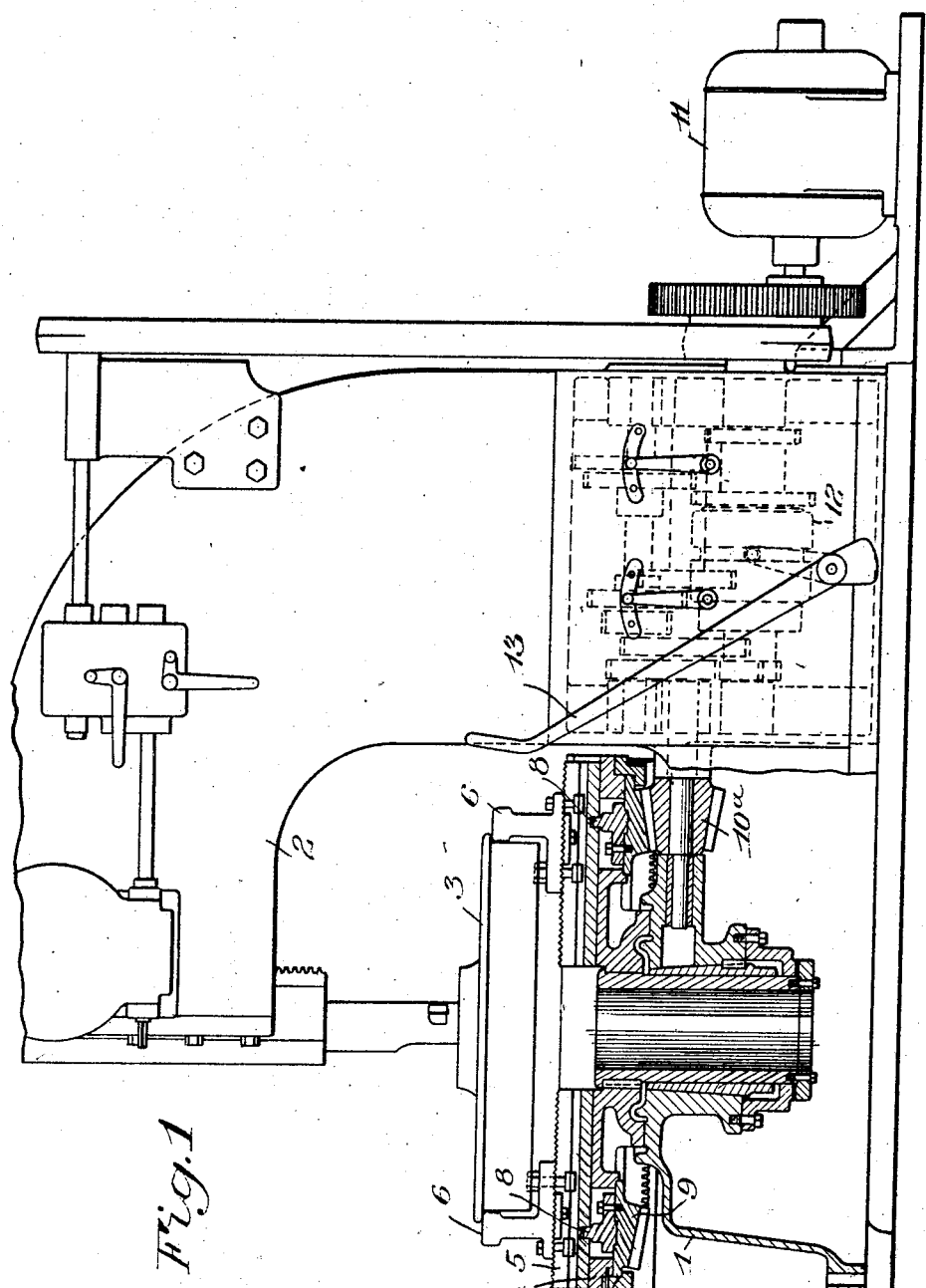

Jan. 26, 1926.                                              1,570,799
A. TROSCH ET AL
WORK CLAMPING MECHANISM FOR VERTICAL BORING AND TURNING MILLS
Filed March 29, 1924      3 Sheets-Sheet 2
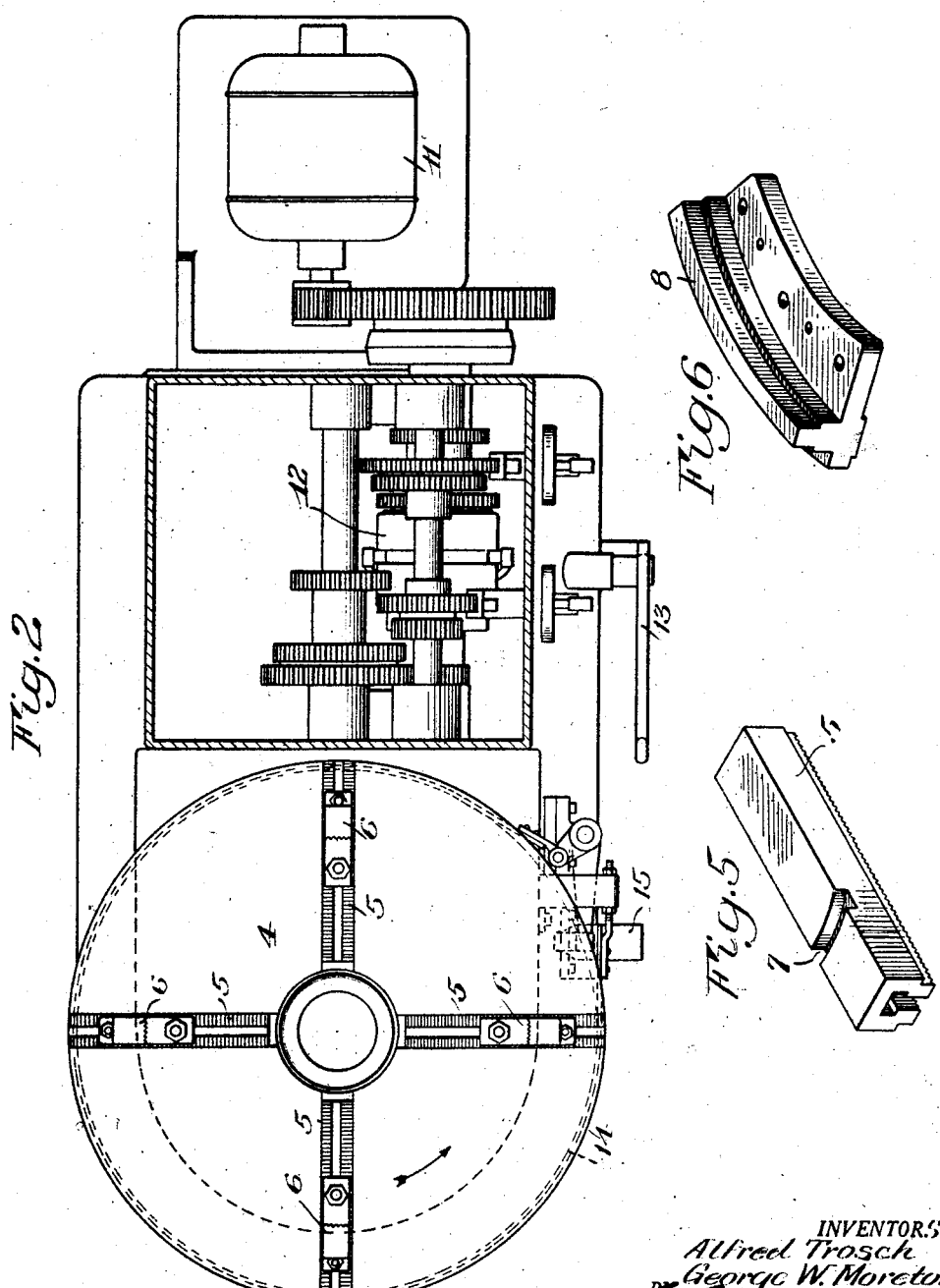

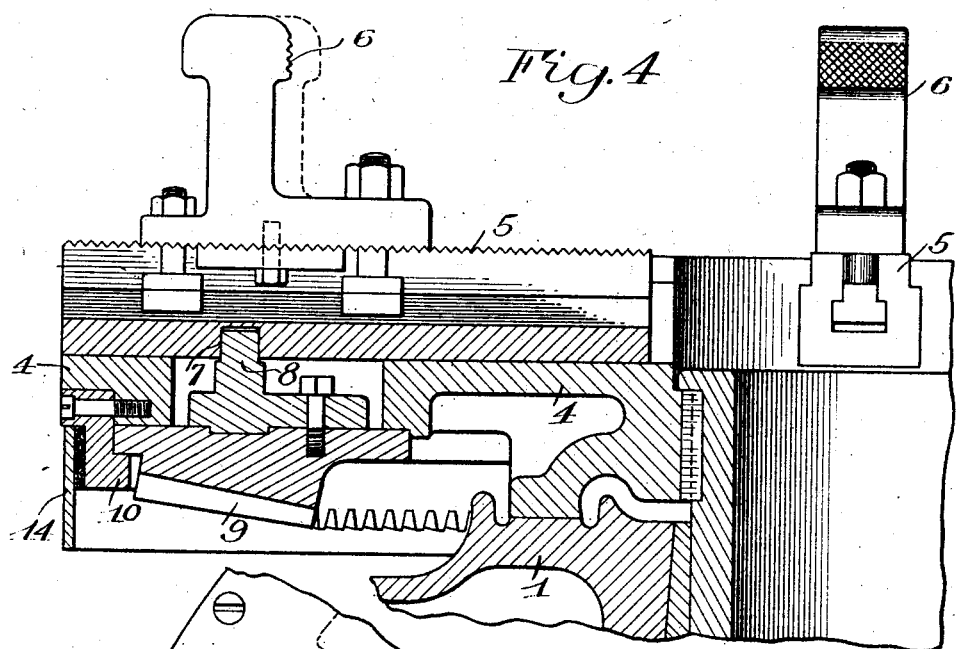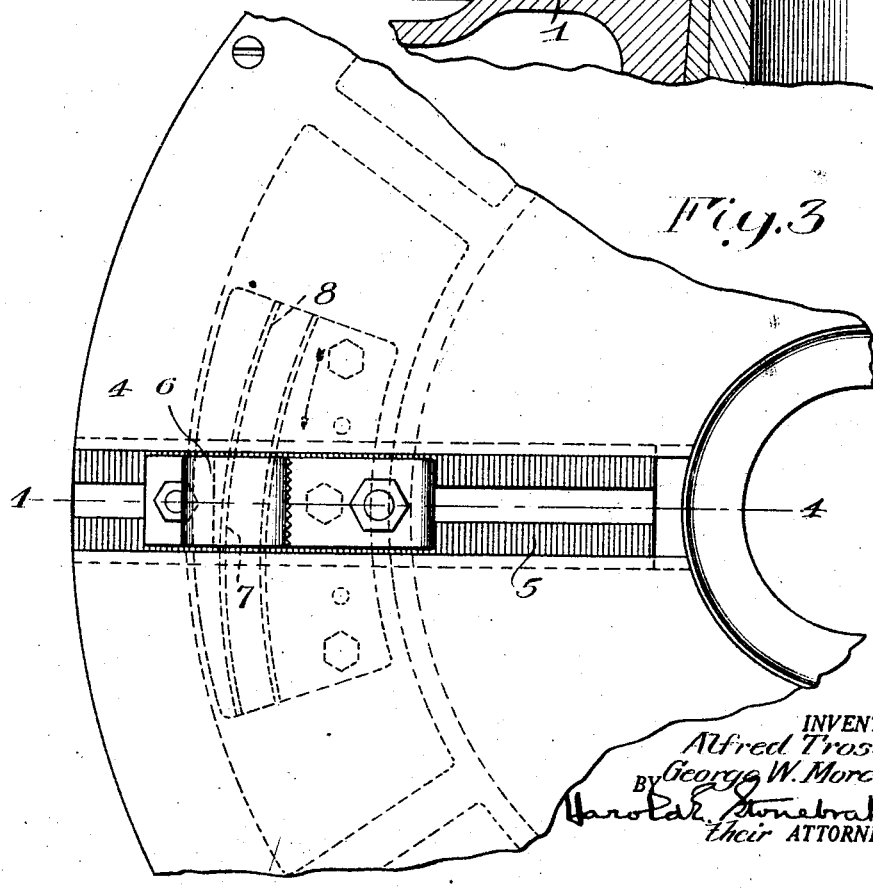

Patented Jan. 26, 1926.

1,570,799

UNITED STATES PATENT OFFICE.

ALFRED TROSCH, OF ROCHESTER, NEW YORK, AND GEORGE W. MORETON, OF WILMINGTON, DELAWARE, ASSIGNORS TO CONSOLIDATED MACHINE TOOL CORPORATION OF AMERICA, OF ROCHESTER, NEW YORK, A CORPORATION OF DELAWARE.

WORK-CLAMPING MECHANISM FOR VERTICAL BORING AND TURNING MILLS.

Application filed March 29, 1924. Serial No. 702,936.

*To all whom it may concern:*

Be it known that we, ALFRED TROSCH and GEORGE W. MORETON, both citizens of the United States of America, residing at Rochester, in the county of Monroe and State of New York, and at Wilmington, in the county of New Castle and State of Delaware, respectively, have invented certain new and useful Improvements in Work-Clamping Mechanism for Vertical Boring and Turning Mills, of which the following is a specification.

Our invention relates to a wheel boring machine, and has to do more particularly with the mechanism for gripping and retaining the work in position on the work table.

The principal object of the invention is to provide a simple and efficient mechanism that permits of readily gripping or releasing a wheel blank on a table, by means of a series of radially movable jaws supported on the work table.

In a more specific aspect, the invention contemplates controlling the work table from a rotary driving member, with a limited amount of independent movement between the work table and driving member, and holding the work table during reverse movement of the driving member in order to effect releasing movement of the work gripping jaws.

Another purpose of the improvement is to afford mechanism that permits of quickly reversing the direction of rotation of the driving member without stopping the machine.

With these and other ends in view, the invention comprises the construction that will be understood from the accompanying drawings, when read in conjunction with the following description, the novel features being pointed out in the claims at the end of the specification.

In the drawings:

Figure 1 is a side elevation of a car wheel boring machine, with the work table and work gripping mechanism appearing in section;

Figure 2 is a plan view of the parts, with the upper parts of the machine removed;

Figure 3 is a partial plan view of the work table;

Figure 4 is a sectional view on line 4—4 of Figure 3;

Figure 5 is a detail perspective view of one of the jaw carrying slides, and

Figure 6 is a detail perspective view of one of the cams on the driving gear.

As an example of a practicable embodiment of our invention, we have illustrated a car wheel boring machine, but the invention is equally applicable to other types of machines as well.

Referring more particularly to the drawings, in which like reference numerals refer to corresponding parts in the several views, 1 designates generally the base of the machine while 2 is the head or upright portion carrying the usual tool mechanism for cooperation with a car wheel blank 3. The latter is supported on a table 4 that is rotated in a manner that will appear presently. 5 designates each of a series of slides which are radially movable in guide ways on the table 4, and 6 are work gripping jaws, one of which is bolted to each slide 5. The slides 5 and the work gripping jaws are movable inwardly or outwardly radially of the table to grip or release the work, as the case may be, by mechanism that will now be described.

Each slide 5 is provided on its under side with an eccentric slot 7, see Figure 5, which is engaged by a cooperating cam 8. A series of such cams 8, one for each slide 5, are fixedly mounted on a driving member in the form of a bevel gear 9 which is supported on a flanged ring 10 carried by the table 4. The driving gear 9 is movable on said ring 10 relatively to the table for a limited distance, and when the driving gear is turned in the proper direction to grip the work, said gear moves independently of the table until the gripping jaws 6 have moved inwardly until they contact with the blank 3. Further inward radial movement of the jaws 6 is then prevented by the work, and further rotation of the driving gear 9 causes the work and table 4 to rotate with it. It is desirable and important to control the driving gear 9 in such a way as to readily permit release of the work, and this is accomplished in the following manner.

10$^a$ is a bevel pinion engaging and moving the driving gear 9, and the pinion 10$^a$ is operated from a motor 11 through friction clutch reversing mechanism designated generally at 12 and controlled by a lever 13. With this arrangement, the motor 11 is continuously operating in the same direction and the direction of travel of the pinion 10 and driving gear 9 can be reversed instantly without stopping the motor, or they can be stopped entirely, by shifting the lever 13 to either reverse or neutral positions respectively. When the direction of movement of the driving gear 9 is reversed, the table and work are also turned in a reverse direction unless prevented by some other mechanism, and when this happens the gripping jaws are released from the work. This is accomplished by holding the table 4 against movement for an instant as the driving gear 9 is reversed. This we accomplish by friction and is preferably effected by a friction band 14 which grips the exterior surface of the ring 10, and is controlled by a suitable lever 15. When the band 14 is contracted to engage the ring 10, the table 4 is held against movement and further reverse travel of the driving gear 9 causes an outward radial movement of the gripping jaws 6 through cams 8 and slides 5, thus releasing the work. This affords a very easy and readily controlled operation, eliminating any jars or shocks to the mechanism, and insuring a quick and positive releasing action of the jaws with relation to the work.

While the invention has been described with reference to a particular detailed arrangement, it is not limited to the mechanism herein set forth, but may be modified or adapted in other ways without departing from the fundamental features underlying the invention or comprehended by the following claims.

We claim:

1. In a vertical boring and turning mill, the combination with a table and a series of work gripping jaws radially movable thereon, of a rotary driving member operatively connected with the jaws to effect such radial movement and movable independently of the table, a reversing clutch for reversing the driving member, and a friction band cooperating with the table and operable to hold the latter against movement during reverse movement of the driving member to effect releasing of the jaws.

2. In a vertical boring and turning mill, the combination with a table and a series of work gripping jaws radially movable thereon, of a slide for each jaw having an eccentric slot on its under side, a rotary driving member having a series of cams fixedly attached thereto and cooperating with the slots in the slides, said driving member being movable independently of the table, a motor for the driving member, a reversing clutch for effecting reverse movement of the driving member, and a friction band cooperating with the table and operable to hold the table against movement during reverse movement of the driving member to effect releasing of the jaws.

In witness whereof, we have hereunto signed our names.

ALFRED TROSCH.
GEORGE W. MORETON.